(12) United States Patent
Schnatzmeyer et al.

(10) Patent No.: US 6,394,181 B2
(45) Date of Patent: *May 28, 2002

(54) SELF-REGULATING LIFT FLUID INJECTION TOOL AND METHOD FOR USE OF SAME

(75) Inventors: Mark A. Schnatzmeyer, Lewisville; Clark E. Robison, Plano; Russell I. Bayh, III, Carrollton, all of TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/916,902

(22) Filed: Jul. 27, 2001

Related U.S. Application Data

(63) Continuation of application No. 09/336,459, filed on Jun. 18, 1999.

(51) Int. Cl.$^7$ ................................................ E21B 43/12
(52) U.S. Cl. ..................... 166/250.15; 166/53; 166/372
(58) Field of Search ........................ 166/250.15, 250.07, 166/319, 320, 370, 372, 373, 386, 66.6, 53

(56) References Cited

U.S. PATENT DOCUMENTS

| 4,566,317 A | | 1/1986 | Shakra | ........................ 73/155 |
| 5,172,717 A | * | 12/1992 | Boyle et al. | ................. 137/155 |
| 5,176,164 A | | 1/1993 | Boyle | ........................ 137/155 |
| 5,469,878 A | | 11/1995 | Pringle | ........................ 137/155 |
| 5,535,767 A | | 7/1996 | Schnatzmeyer et al. | ........ 137/1 |
| 5,718,289 A | | 2/1998 | Schnatzmeyer et al. | . 166/305.1 |
| 5,732,776 A | | 3/1998 | Tubel et al. | ............ 166/250.15 |
| 5,755,288 A | * | 5/1998 | Bearden et al. | .............. 166/370 |
| 5,823,263 A | * | 10/1998 | Morris et al. | ................. 166/373 |
| 5,839,508 A | * | 11/1998 | Tubel et al. | ................ 166/65.1 |
| 5,896,924 A | | 4/1999 | Carmody et al. | .............. 166/53 |
| 5,937,945 A | * | 8/1999 | Bussear et al. | ......... 166/250.15 |
| 5,975,204 A | * | 11/1999 | Tubel et al. | ............ 166/250.15 |

FOREIGN PATENT DOCUMENTS

| EP | 0 681 090 A2 | 11/1995 | ........... E21B/47/18 |
| WO | WO 95/22682 | 8/1995 | ........... E21B/34/06 |
| WO | WO 00/75484 A1 | 12/2000 | ........... E21B/34/10 |

* cited by examiner

Primary Examiner—William Neuder
(74) Attorney, Agent, or Firm—William M. Imwalle; Lawrence R. Youst

(57) ABSTRACT

A self-regulating lift fluid injection tool (100) adapted for placement within production tubing (30). The tool (100) has a control valve (126) that controls the rate of injection of a lift fluid (102) into the formation fluids (104) being produced through the production tubing (30). A sensor (140) monitors the flow rate of the formation fluids (104) through the production tubing (30). The sensor (140) generates a signal indicative the flow rate of the formation fluids (104) which is sent to an electronics package (142). The electronics package (142) generates a control signal in response to the signal received from the sensor (140) that is received by an actuator (176). The actuator (176) adjusts the position of the control valve (126) to regulate the flow rate of the lift fluid (102) therethrough in response to the control signal, thereby optimizing the flow rate of the formation fluids (104).

28 Claims, 4 Drawing Sheets

SELF-REGULATING LIFT FLUID INJECTION TOOL AND METHOD FOR USE OF SAME

RELATED APPLICATION

This application is a continuation of pending application Ser. No. 09/336,459, filed on Jun. 18, 1999.

TECHNICAL FIELD OF THE INVENTION

The present invention relates, in general, to enhancing recovery from a hydrocarbon formation and, in particular, to a self-regulatory lift fluid injection tool for controlling the flow rate of a lift fluid injected into the production tubing to enhance the recovery of formation fluids from a hydrocarbon producing well.

BACKGROUND OF THE INVENTION

Efficiently producing hydrocarbon fluids from downhole formations is a challenging process involving a multitude of different types of equipment and techniques for recovering the fluids from the selected formation. Normally, when production from a hydrocarbon reservoir is commenced, the fluid pressure present in the formation is sufficient to force the liquids to the surface for recovery. After a period of time, however, the natural formation pressure may decline to a point where the pressure is not sufficient to lift the formation fluids to the surface at the desired rate of recovery. In these instances, alternative methods of enhancing the extraction of hydrocarbon fluids from the formation may be employed to augment recovery of formation fluids.

One method of enhancing the recovery of hydrocarbons from a formation is to decrease the hydrostatic head of the column of fluid in the wellbore. Decreasing the hydrostatic head enhances recovery by reducing the amount of pressure required to lift the fluids to the surface. Decreasing the density of the column of fluid extending from the formation to the surface is a technique utilized to reduce the hydrostatic head of the fluid column. For example, mixing a lower density fluid with formation fluids reduces the overall density of the fluid column and consequently decreases the hydrostatic head.

One way to achieve this is by forcing a lift fluid, typically a gas or hydraulic fluid having low density, down the annulus between the production tubing and the casing of the well. The low density fluid is then injected into the production tubing at one or more predetermined locations where it mixes with formation fluids, lowering the density of the fluid column above the formation. The injection of the low density fluid into the production tubing, however, must be carefully controlled to avoid equipment damage while simultaneously providing for optimal recovery. For example, excessive injection rates can result in pressure surges in the tubing and related equipment. Such pressure surges may produce large and destructive forces within the production equipment.

Control of the injection rate is typically accomplished using a metering means such as an orifice, the size of which is typically determined using a trial and error procedure. Thus, the operator attempts to achieve optimum performance of the well by regulating the rate of injection of the lift fluids with various size orifice valves. In practice, the well operator will typically try several orifice settings, allowing the well to stabilize after each adjustment. Due to the distances, location of the valves and the fluid volumes involved, the operator may spend a significant amount of time in making the adjustments, stabilizing production after each adjustment and collecting comparative data from the different settings to establish performance trends.

Therefore, a need has arisen for a lift fluid injection tool that controls the flow of a lift fluid into the production tubing based upon well parameters in an artificial lift well. A need has also arisen for such a tool that does not require the intervention of the well operator to optimize production from the formation. Additionally, a need has arisen for such a tool that periodically monitors and adjusts the injection rate of the lift fluid.

SUMMARY OF THE INVENTION

The present invention disclosed herein provides a self-regulating lift fluid injection tool that controls the flow of a lift fluid into the production tubing based upon well parameters in an artificial lift well. The tool of the present invention does not require the intervention of the well operator to optimize production from the formation. The tool of the present invention monitors and adjusts the injection rate of the lift fluid in response to changes in well parameters, prompting by the operator or simply on a periodic basis.

The tool of the present invention is adapted for placement generally concentrically within production tubing disposed within a well casing. The tool includes a control valve that controls the rate of injection of the lift fluid into the formation fluids being produced through the production tubing. A sensor monitors the flow rate of the formation fluids through the production tubing and providing a signal indicative thereof. An electronics package is communicably coupled to the sensor and generates a control signal in response to the signal received from the sensor. An actuator is communicably coupled to the electronics package and adjusts the position of the control valve to regulate the flow rate of the lift fluid therethrough in response to the control signal.

The sensor may include an impeller that rotates in response to the flow of the formation fluids through the production tubing. The impeller may also be used to control the flow rate of the formation fluids.

The tool includes a power source for providing electrical power. The power source may be a battery pack which may be charged using a downhole generator powered by the flow of the lift fluid through the tool or the flow of formation fluids around the tool.

The tool may be linked to a remote location such as a surface facility using a transmitter either alone or in combination with a receiver, each of which are disposed within the tool.

The electronics package of the tool includes a set of preprogrammed instructions for controlling the actuator. For example, the actuator may incrementally adjust the position of the control valve to increase the rate of injection of the lift fluid when the sensor indicates that the rate of recovery of the formation fluids increased in response to a prior incremental adjustment of the position of the control valve to increase the rate of injection of the lift fluid. Alternatively, the actuator may incrementally adjust the position of the control valve to decrease the rate of injection of the lift fluid when the sensor indicates that the rate of recovery of the formation fluids decreased in response to a prior incremental adjustment of the position of the control valve to increase the rate of injection of the lift fluid.

The control valve may include an orifice plate having an orifice and a poppet that is operably connected to the actuator. The poppet may be advanced and retracted relative to the orifice to control the flow of the lift fluid therethrough.

The self-regulating method for controlling the injection of a lift fluid into formation fluids of the present invention involves disposing a lift fluid injection tool having a control valve and a sensor within the production tubing, monitoring the flow rate of the formation fluids through the production tubing with the sensor and adjusting the position of the control valve in response to the flow rate of the formation fluids, thereby controlling the injection of a lift fluid into formation fluids. The step of monitoring the flow rate of the formation fluids through the production tubing may be accomplished by rotating an impeller in response to the flow of the formation fluids. In the method of the present invention, information may be communicated between the tool and a remote location using transmitter and a receiver disposed within the tool.

The step of adjusting the position of the control valve in response to the flow rate of the formation fluids may involve incrementally adjusting the position of the control valve to increase the rate of injection of the lift fluid when the sensor indicates that the rate of recovery of the formation fluids increased in response to a prior incremental adjustment of the position of the control valve to increase the rate of injection of the lift fluid. Alternatively, the step of adjusting the position of the control valve in response to the flow rate of the formation fluids may involve incrementally adjusting the position of the control valve to decrease the rate of injection of the lift fluid when the sensor indicates that the rate of recovery of the formation fluids decreased in response to a prior incremental adjustment of the position of the control valve to increase the rate of injection of the lift fluid.

BRIEF DESCRIPTION OF THE DRAWINGS

For a more complete understanding of the present invention, and the advantages thereof, reference is now made to the following descriptions taken in conjunction with the accompanying drawings, wherein like elements are numbered alike and wherein.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the invention.

Figure 1:
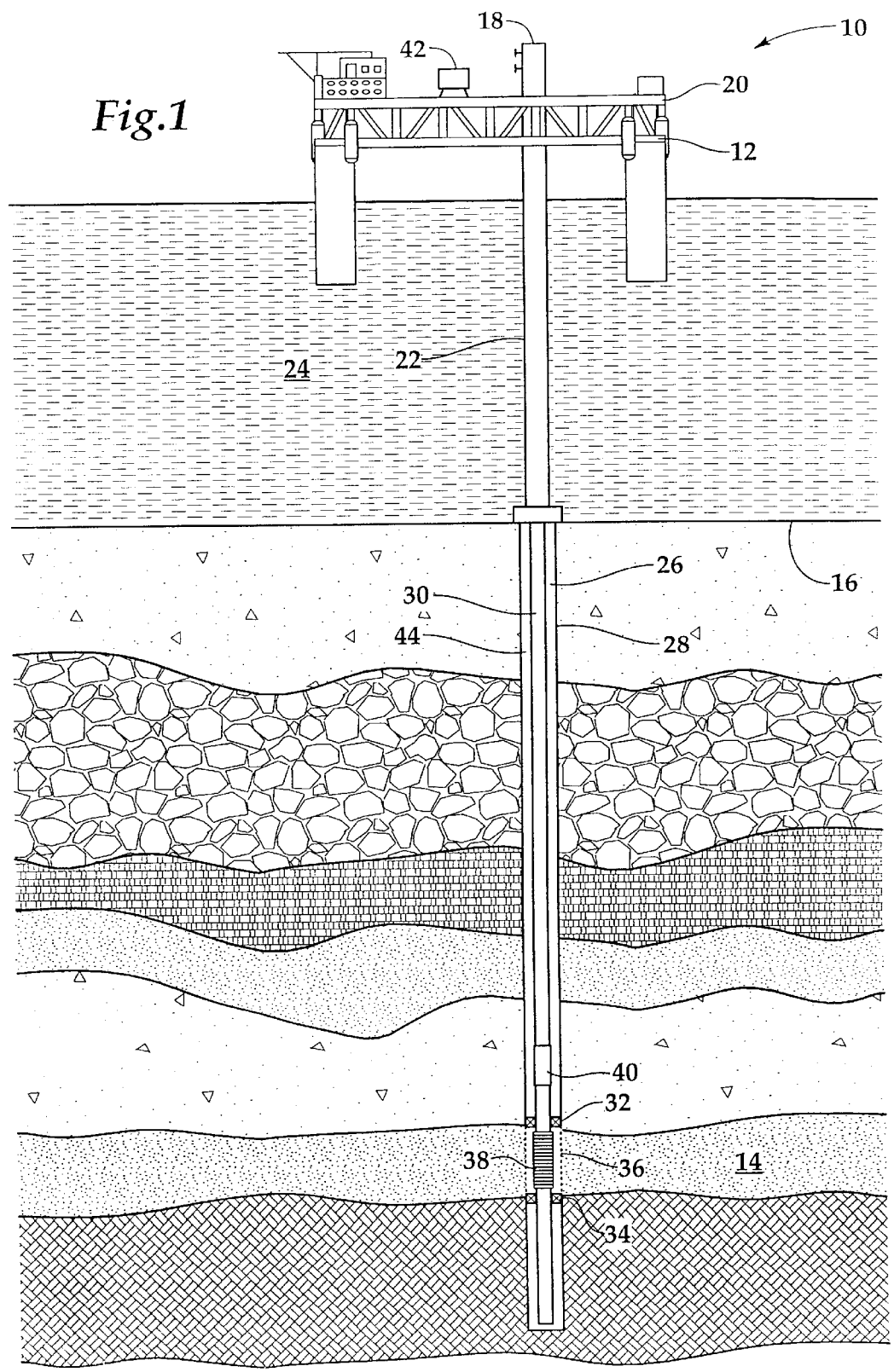
FIG. 1 is a schematic illustration of an offshore production platform operating a self-regulating lift fluid injection tool of the present invention.

Referring to FIG. 1, a self-regulating lift fluid injection tool in use with an offshore oil and gas production platform is schematically illustrated and generally designated 10. A semi-submersible platform 12 is centered over a submerged oil and gas formation 14 located below sea floor 16. Wellhead 18 is located on deck 20 of platform 12. Well 22 extends through the sea 24 and penetrates the various earth strata including formation 14 to form wellbore 26. Disposed within wellbore 26 is casing 28. Disposed within casing 28 and extending from wellhead 18 is production tubing 30. A pair of seal assemblies 32, 34 provide a seal between tubing 30 and casing 28 to prevent the flow of production fluids therebetween. During production, formation fluids enter wellbore 26 through perforations 36 of casing 28 and travel into tubing 30 through sand control device 38 to wellhead 18.

As explained above, when the formation pressure is not adequate to lift the formation fluids to the surface, artificial lift may be necessary. In the illustrated embodiment, a self-regulating lift fluid injection tool 40 is disposed within tubing 30. A lift fluid is provided to injection tool 40 from a lift fluid source 42 which may be a compressor, a pump or the like. The lift fluid travels to injection tool 40 through the annulus 44 defined between casing 28 and tubing 30. The lift fluid enters tubing 30 through injection tool 40 and mixes with formation fluids to lower the density of the formation fluids, which allows the formation fluids to travel up tubing 30 to wellhead 18. Alternatively, it should be noted that the lift fluid may be provided from a different location in the same well or from another well. It should also be noted by those skilled in the art that even though FIG. 1 depicts an offshore environment, injection tool 40 of the present invention is equally well-suited for onshore service.

Figure 2:
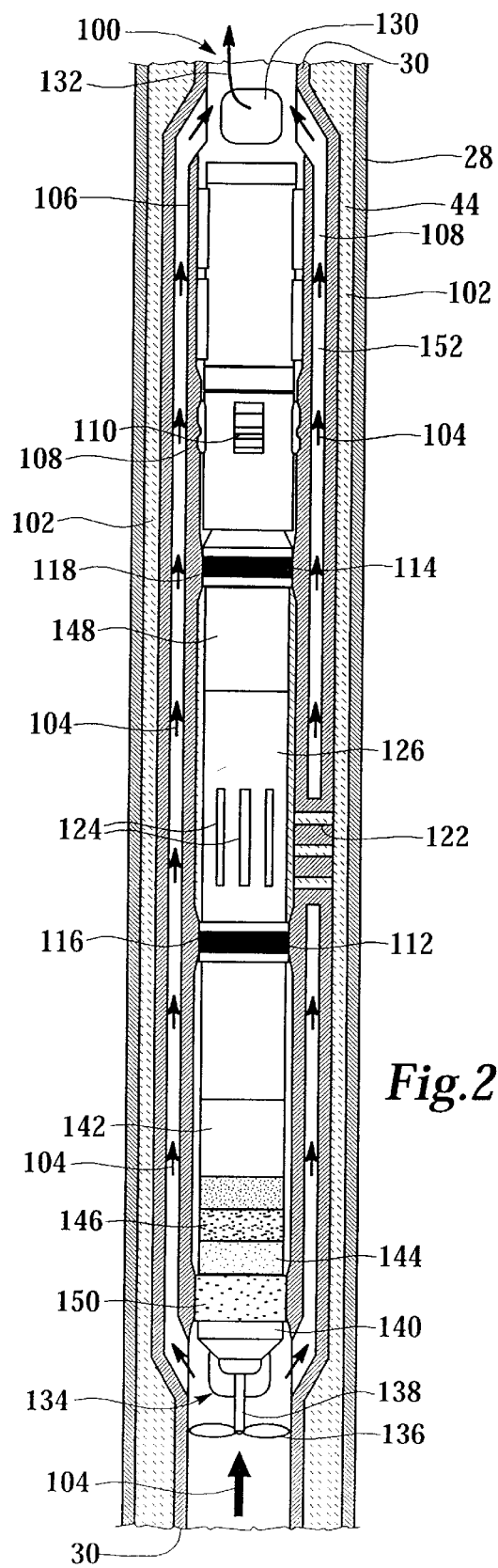
FIG. 2 is a cross-sectional view of a self-regulating lift fluid injection tool of the present invention.

Turning now to FIG. 2, a self-regulating lift fluid injecting tool is schematically depicted and generally designated 100. Injection tool 100 of the present invention is positioned in tubing string 30 at a preselected depth for injection of lift fluid 102 at the desired location. As will be appreciated by those skilled in the art, lift fluid 102 may be a gas or a liquid utilized to adjust the density of formation fluids represented herein by arrows 104 during the recovery process irrespective of the physical phase of lift fluid 102.

As illustrated, injection tool 100 is received within an inner mandrel 106 of tubing 30. Inner mandrel 106 includes a landing nipple 108 that engages and supports locking device 110 of injection tool 100. A pair of seal assemblies 112, 114 sealing engage radially reduced areas 116, 118 of inner mandrel 106, respectively. Tool 100 may be configured as a tubing retrievable device or as a wireline tool.

In the practice of the present invention, lift fluid 102 is injected down annulus 44 between tubing 30 and casing 28. Lift fluid 102 then flows through cross over ports 122 into inlet ports 124. It should be noted that the use of directional terms such as vertical, horizontal, above, below, upper, lower, upward, downward, etc. are used in relation to the illustrative embodiments as depicted in the figures, the upward direction being toward the top of the corresponding figure and the downward direction being toward the bottom of the corresponding figure. Thus, it is to be understood that tool 100 of the present invention may be operated in vertical, horizontal, inverted or inclined orientations without deviating from the principles of the invention.

The flow rate of lift fluid 102 through tool 100 is regulated by a control valve 126 within tool 100 as will be more fully described with reference to FIG. 4 below. Generally, control valve 126 is actuated by an actuator. The actuator may be electrical, mechanical or a combination of the foregoing. For example, the actuator may be an electric motor or a solenoid equipped with a mechanical linkage to advance and retract a poppet relative to an orifice. Seal assemblies 112, 114 isolate formation fluids 104 from lift fluid 102 as lift fluid 102 passes through crossover ports 122 and inlet ports 124.

Lift fluid 102 then flows upwardly through control valve 126 and the remainder of tool 100. Lift fluid 102 is then injected into tubing 30 at exit port 130 as generally indicated by arrow 132. Although, as illustrated, lift fluid 102 is injected into tubing string 30 at a single location through port 130, those skilled in the art will appreciate that lift fluid 102 may be injected into tubing string 30 at multiple locations using multiple ports and further, that lift fluid 102 may be mixed with formation fluids 104 through the use of a stationary mixer such as a fixed vane mixer or through the use of a powered mixer such as a motor driven impeller.

Tool 100 is equipped with a flow measuring device 134. In the illustrated embodiment, flow measuring device 134 includes an impeller 136 mounted on impeller shaft 138. As formation fluids 104 flow through impeller 136 and around tool 100 as generally indicated by arrows 104, a sheer force is imposed upon impeller 136, causing impeller 136 to rotate at a rate proportional to the flow rate of formation fluids 104 through tool 100. As impeller 136 rotates, the rate of rotation is transmitted to a flow sensor 140 via impeller shaft 138. Flow sensor 140 generates a signal proportional to the rate of rotation of impeller 136 which is subsequently interpreted as a flow rate. The signal from flow sensor 140 is relayed to electronics package 142 and optionally to transmitter 144 for transmission to a surface or remote location for recording and review by the well operator. Transmitter 144 may be equipped to transmit information via electromagnetic waves, acoustic waves, mud pulses or other means of telemetry known to those skilled in the art. Transmitter 144 may also be hard-wired to a surface or remote location for the transmission of information.

Electronics package 142 and transmitter 144 may be powered by a battery pack 146 which may be charged by one or more power generators 148, 150. The power generator 148 may be a turbine powered by lift fluid 102 as lift fluid 102 travels through tool 100. Alternatively, power generator 148 may be a thermoelectric device. Alternatively or additionally, power generator 150 may be an electrical generator coupled directly to impeller shaft 138. The use of an electrical generator coupled to impeller shaft 138 also provides the capability of controlling, to some extent, the velocity of formation fluids 104 flowing past impeller 136 by regulating the speed of impeller 136.

As best illustrated in FIG. 2, tool 100 of the present invention is situated in a central location of tubing string 30, generally referred to hereinafter as "concentric positioning." Concentrically locating tool 100 provides numerous advantages over side pocket positioning. Since the size and weight of side pocket mounted tools is limited by the ability of kick over devices to position the tools, a concentrically located tool provides the capability of incorporating instrumentation and equipment that cannot be incorporated into a side pocket mounted unit. In addition, tool 100 is not constrained by well deviation angles as are side pocket tools and tool 100 can be run and pulled by coiled tubing as well as wireline. Because the weight and dimensions of the tool 100 are not constrained by the limits imposed by side pocket positioning, tool 100 may include equipment, features and functionalities without regard to the limitations inherent to side pocket mounted tools.

In the illustrated embodiment, the cross sectional area of tubing 30 above and below tool 100 is generally equivalent to the cross sectional areas of the annulus 152 between tubing 30 and inner mandrel 106. Consequently, the flow of formation fluids 104 past tool 100 is not impeded by the positioning of tool 100 in tubing string 30. As illustrated, the flow of formation fluids 104 is along the path generally designated with arrows 104. Thus, tool 100 of the present invention provides the capability of locating the desired equipment and instrumentation at the desired downhole location to augment the recovery of formation fluids 104 without significantly impeding the flow of formation fluids 104 through tubing string 30.

Figure 3:
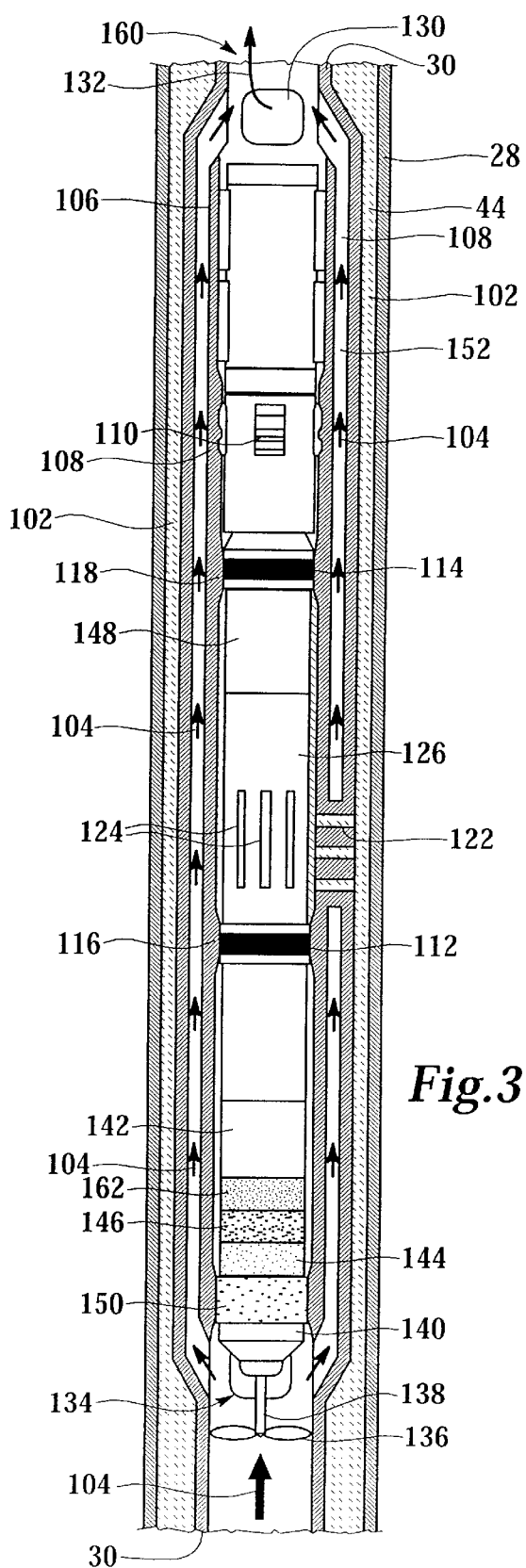
FIG. 3 is a cross-sectional view of a self-regulating lift fluid injection tool of the present invention.

Turning now to FIG. 3, another embodiment of the self-regulating lift fluid tool is depicted and generally designated 160. Tool 160 is generally identical to tool 100 except tool 106 includes a receiver 162 for reception of signals transmitted from a remote location, for example, from a transmitter located at a surface location (not shown). Receiver 162 is operatively connected to electronics package 142. This allows an operator at a remote location to override preprogramed instructions resident in electronics package 142 and control the operation of the tool 160, e.g., the flow rate of lift fluid 102, from a surface or remote location. While it is anticipated that in most cases it will be desirable to maximize well production, in some instances it may be desirable to override the preprogrammed instructions that would normally optimize well production as a function of the flow rate of lift fluid 102 as will be discussed in more detail below. For example, if the available supply of lift fluid 102 in a particular field is limited, it may be advantageous to utilize less than the optimum amount of lift fluid 102 in a particular well in order to increase production from a higher producing well. Receiver 162 may receive information transmitted downhole via electromagnetic waves, acoustic waves, pressure pulses or other suitable telemetry system known to those skilled in the art. Receiver 162 may alternatively be hard-wired to the surface or remote location.

Figure 4:
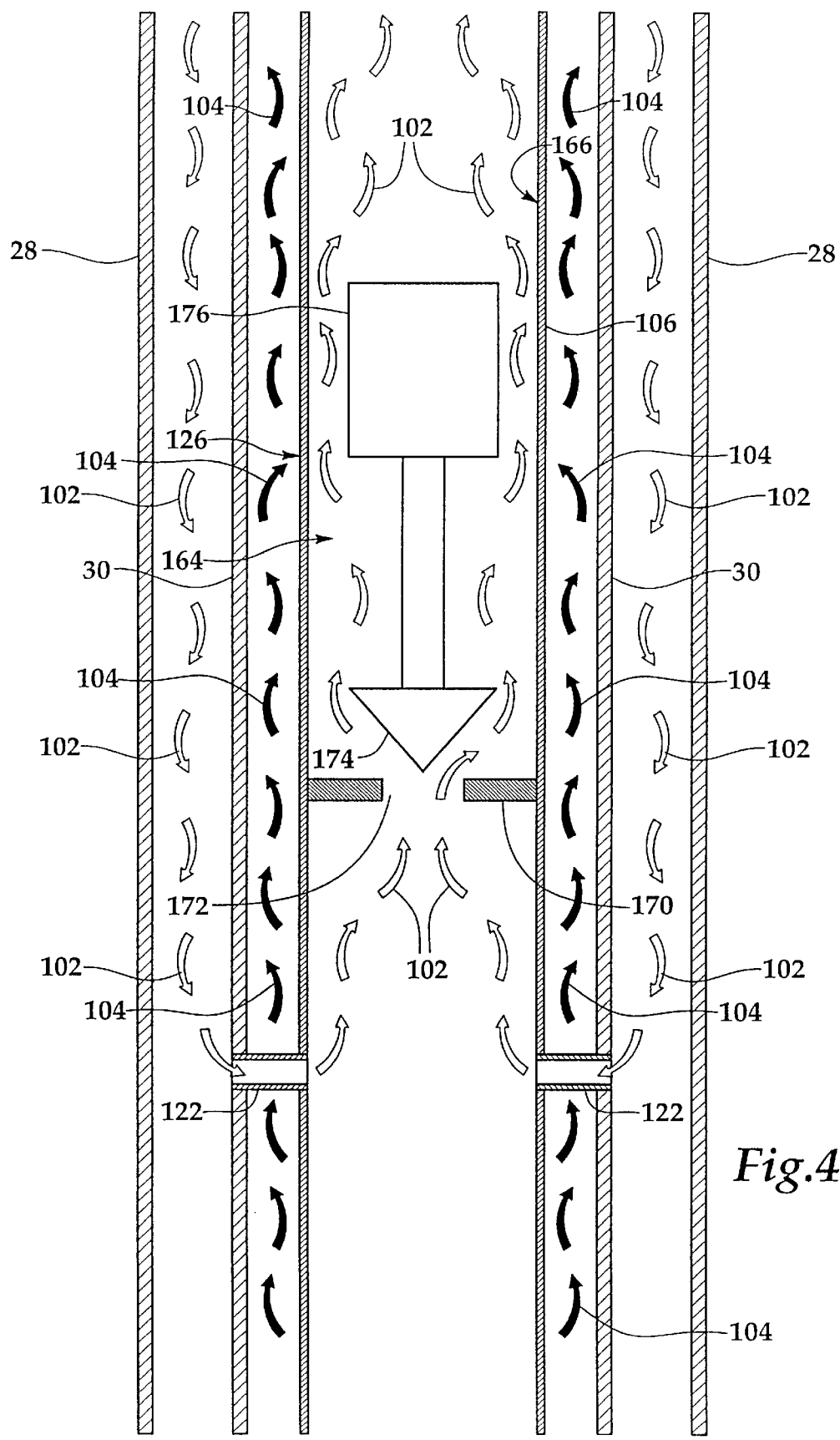
FIG. 4 is a schematic illustration of a control valve for use with a self-regulating lift fluid injection tool of the present invention.

Referring now to FIG. 4, a schematic illustration of a downhole adjustable choke valve 164 for use in control valve 126 of tool 100 of FIG. 2 or tool 160 of FIG. 3 is depicted. Choke valve 164 is disposed within inner mandrel 106 of tubing 30. In the illustrated embodiment, lift fluid 102 flows down between tubing 30 and casing 28 through cross over ports 122 and into choke valve 164 as generally indicated by arrows 102. The lift fluid 102 travels through central bore 166 of choke valve 164. Formation fluids 104 are diverted around choke valve 164 as generally indicated by arrows 104. Lift fluid 102 is injected into the formation fluids 104 above choke valve 164 inside of tubing 30.

As illustrated, lift fluid 102 enters choke valve 164 and passes through orifice plate 170 via orifice 172. The flow of lift fluid 102 through choke valve 164 is controlled with poppet 174 which is positioned relative to the orifice plate 170 by actuator 176. In order to adjust the flow of lift fluid 102 through choke valve 164, poppet 174 is advanced or retracted relative to the orifice plate 170, thereby decreasing or increasing the effective opening of orifice 172.

Actuator 176 positions poppet 174 relative to orifice plate 170 in response to a control signal received from electronics package 142. As noted with reference to FIGS. 2 and 3 above, the control signal may be generated periodically by electronics package 142 based upon the preprogrammed instructions stored therein or in response to a change in the flow rate of formation fluids 104 sensed by flow measuring device 134 and flow sensor 140 as will be more fully explained below. Although choke valve 164 is illustrated as a poppet type valve, other variable position flow control devices may be utilized in the practice of the invention including, but not limited to, annular sleeves, ball valves, labyrinths and the like.

Figure 5:
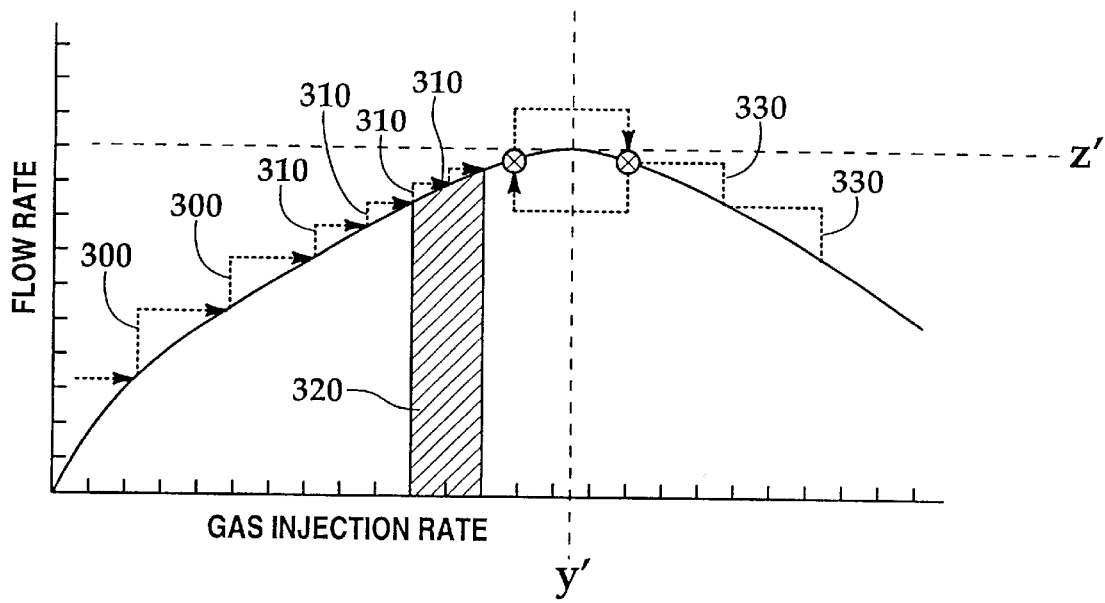
FIG. 5 is a graphical representation of the relationship between the injection rate of a lift fluid and the flow rate of formation fluids from a well.

Referring now to FIG. 5, the flow rate of formation fluids 104 in a well where fluid recovery is enhanced using a self-regulating lift fluid tool of the present invention is depicted as a function of the injection rate of lift fluid 102. Notably, the recovery as a function of injection rate reaches a maximum where the flow rate curve intersects the axes designated y' and z'. Injecting additional lift fluid 102 beyond this maximum actually decreases the productivity of the well.

Figure 6:
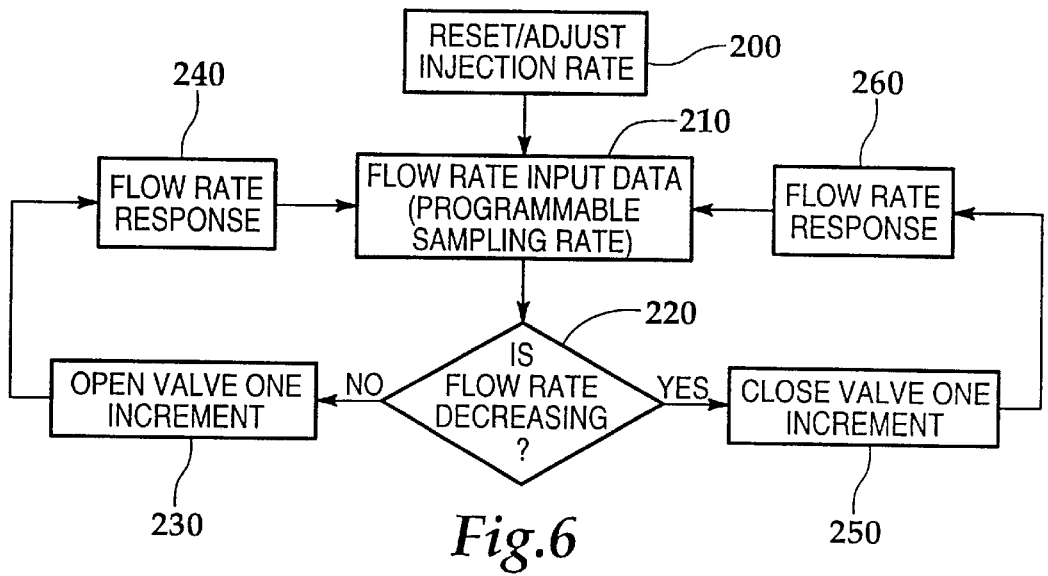
FIG. 6 is a block diagram illustrating various steps utilized in the system of the present invention to control the injection rate of a lift fluid into a well.

As best illustrated in FIGS. 5 and 6 in conjunction, the self-regulating lift fluid injection tool of the present invention optimizes well productivity by adjusting the rate of injection of lift fluid 102. Electronics package 142 includes preprogrammed instructions stored on a conventional memory device that generates a signal at step 200 to initiate or reset the flow rate of lift fluid 102 at predetermined intervals or in response to a change in the flow rate of formation fluids 104. The flow rate of lift fluid 102 is cut back to a predetermined level in response to the signal and then incrementally increased as best illustrated in FIG. 5. Production flow rate input data is sampled with flow sensor 140 via impeller 136 and compared to a predetermined value which may be preset by the operator, determined as a function of prior production over a given.period of time or in response to a change in the flow rate of formation fluids 104.

In step 220, the production flow rate is monitored to determine whether a decrease has occurred as a function of an incremental change in the rate of injection of lift fluid 102. If the flow rate of formation fluids 104 has not decreased, in step 230, the injection rate of lift fluid 102 is increased initially in increments 300 and then increments 310 as the flow rate of formation fluids 104 reaches the maximum. Increments 310 allow the self-regulating lift fluid injection tool of the present invention to fine tune the flow rate of lift fluid 102 near the maximum. In addition, it should be noted that a zone of instability 320 may exist as production nears the maximum. Thus, the optimum flow rate of formation fluids 104 may be less than the theoretical maximum as indicated by FIG. 5. Generally, however, as long as the flow rate response in step 240 increases with each incremental increase 300 or 310, steps 210, 220, 230 and 240 are repeated.

If the flow rate of formation fluids 104 begins to decrease as determined in step 220 and as indicated by increments 330, the flow rate of lift fluid 102 is decreased in step 250 with the flow rate response being monitored in step 260. This process continues until the maximum flow rate at the location indicated by the intersection of the y' and z' axes or the optimum flow rate is reached. The instructions programmed into electronics package 142 may also include commands to adjust or reduce the flow of lift fluid 102 in the event that the flow of formation fluids 104 becomes unstable, e.g., in the event of sudden changes in pressure or flow rate.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A self-regulating injection tool comprising:
a mandrel that is substantially concentrically disposed within a production tubing forming a first annulus therebetween, the production tubing disposed within a well casing forming a second annulus therebetween;
a control valve operably disposed within the mandrel that controls the rate of injection of a first fluid received from the second annulus into a second fluid being produced through the production tubing and the first annulus;
a sensor that monitors the flow rate of the second fluid through the production tubing and provides a signal indicative thereof;
an electronics package communicably coupled to the sensor that generates a control signal in response to the signal received from the sensor; and
an actuator communicably coupled to the electronics package that adjusts the position of the control valve to regulate the flow rate of the first fluid therethrough in response to the control signal.

2. The tool as recited in claim 1 wherein the cross sectional area of the first annulus is substantially the same as the cross sectional area of the second annulus.

3. The tool as recited in claim 1 further comprising a transmitter communicably coupled to the electronics package that transmits information from the tool to a remote location.

4. The tool as recited in claim 1 wherein the sensor further comprises an impeller that rotates in response to the flow of the second fluid through the production tubing.

5. The tool as recited in claim 4 wherein the impeller is used to control the flow rate of the second fluid.

6. The tool as recited in claim 1 further comprising a power source for providing electrical power.

7. The tool as recited in claim 6 wherein the power source comprises a battery pack.

8. The tool as recited in claim 6 wherein the power source comprises a turbine operated by the flow of the first fluid through the tool.

9. The tool as recited in claim 6 wherein the power source comprises a generator.

10. The tool as recited in claim 1 further comprising a receiver communicably coupled to the electronics package that receives information from a remote location.

11. The tool as recited in claim 1 wherein the electronics package further comprises a set of preprogrammed instructions that control the actuator.

12. The tool as recited in claim 1 wherein the actuator incrementally adjusts the position of the control valve to increase the rate of injection of the first fluid when the sensor indicates that the rate of recovery of the second fluid increased in response to a prior incremental adjustment of the position of the control valve to increase the rate of injection of the first fluid.

13. The tool as recited in claim 1 wherein the actuator incrementally adjusts the position of the control valve to decrease the rate of injection of the first fluid when the sensor indicates that the rate of recovery of the second fluid decreased in response to a prior incremental adjustment of the position of the control valve to increase the rate of injection of the first fluid.

14. The tool as recited in claim 1 wherein the control valve further comprises an orifice plate having an orifice.

15. The tool as recited in claim 14 wherein the control valve further comprises a poppet operably connected to the actuator, the poppet being advanced and retracted relative to the orifice to control the flow of the first fluid therethrough.

16. A self-regulating method for controlling the injection of a first fluid into a second fluid passing through production tubing comprising:

disposing a fluid injection tool within a mandrel substantially concentrically positioned within the production tubing forming a first annulus therebetween, the production tubing positioned within a well casing forming a second annulus therebetween;

monitoring the flow rate of the second fluid through the production tubing with a downhole sensor; and adjusting the position of a control valve in response to the flow rate of the second fluid, thereby controlling the injection of the first fluid received from the second annulus into the second fluid being produced through the production tubing and the first annulus.

17. The method as recited in claim 16 wherein the cross sectional area of the first annulus is substantially the same as the cross sectional area of the second annulus.

18. The method as recited in claim 16 wherein the step of monitoring the flow rate of the second fluid through the production tubing with the sensor further comprises rotating an impeller in response to the flow of the second fluid.

19. The method as recited in claim 18 further comprising controlling the flow rate of the second fluid with the impeller.

20. The method as recited in claim 16 further comprising transmitting information from the tool to a remote location with a transmitter disposed in the tool.

21. The method as recited in claim 16 further comprising providing electrical power from a power source within the tool.

22. The method as recited in claim 21 wherein the power source comprises a battery pack.

23. The method as recited in claim 21 wherein the step of providing electrical power from a power source within the tool further comprises operating a turbine with the flow of the first fluid through the tool.

24. The method as recited in claim 21 wherein the step of providing electrical power from a power source within the tool further comprises rotating an impeller with the flow of the second fluid.

25. The method as recited in claim 16 further comprising receiving information from a remote location with a receiver disposed in the tool.

26. The method as recited in claim 16 wherein the step of adjusting the position of the control valve in response to the flow rate of the second fluid further comprises incrementally adjusting the position of the control valve to increase the rate of injection of the first fluid when the sensor indicates that the rate of recovery of the second fluid increased in response to a prior incremental adjustment of the position of the control valve to increase the rate of injection of the first fluid.

27. The method as recited in claim 16 wherein the step of adjusting the position of the control valve in response to the flow rate of the second fluid further comprises incrementally adjusting the position of the control valve to decrease the rate of injection of the first fluid when the sensor indicates that the rate of recovery of the second fluid decreased in response to a prior incremental adjustment of the position of the control valve to increase the rate of injection of the first fluid.

28. The method as recited in claim 16 wherein the step of adjusting the position of the control valve in response to the flow rate of the second fluid further comprises advancing and retracting a poppet relative to an orifice to control the flow of the first fluid therethrough.

* * * * *